United States Patent [19]

Reich

[11] 4,341,920
[45] Jul. 27, 1982

[54] CAMOUFLAGED BUSBAR-CARRYING COVER FOR A WALL-INCASED JUNCTION-BOX

[76] Inventor: Arthur A. Reich, 1059 N. 6th St., Springfield, Ill. 62702

[21] Appl. No.: 224,755

[22] Filed: Jan. 13, 1981

[51] Int. Cl.³ .............................................. H02G 5/08
[52] U.S. Cl. ...................................... 174/66; 174/59; 339/123; 339/254 M
[58] Field of Search ............................ 174/66, 67, 59; 220/241, 242; 339/123, 198 S, 254 R, 254 M; 109/50; 428/919

[56] References Cited

U.S. PATENT DOCUMENTS

| | | | |
|---|---|---|---|
| 1,615,168 | 1/1927 | Doppke | 339/198 S |
| 2,552,432 | 5/1951 | Juetten | 339/123 X |
| 3,066,274 | 11/1962 | Ellis, Jr. | 339/254 R X |
| 3,675,183 | 7/1972 | Drake | 339/123 R X |
| 4,083,314 | 4/1978 | Garvin | 109/50 |

FOREIGN PATENT DOCUMENTS 2251212  5/1974  Fed. Rep. of Germany ... 339/254 M

*Primary Examiner*—B. A. Reynolds
*Assistant Examiner*—D. A. Tone
*Attorney, Agent, or Firm*—Ralph F. Staubly

[57] ABSTRACT

A wall-recessed electrical-outlet box is employed as a wiring junction-box, especially for burglar-alarm systems, and is camouflagingly concealed by a cover plate the face of which simulates an electrical device commonly found in such a location. The rear face of the cover plate carries a plurality of labeled busbar-like elements. Wires which enter the box from within the wall can be pulled out somewhat and have their ends soldered to the busbar-like elements while the plate is temporarily held conveniently spaced from the box.

4 Claims, 5 Drawing Figures

CAMOUFLAGED BUSBAR-CARRYING COVER FOR A WALL-INCASED JUNCTION-BOX

BACKGROUND AND OBJECTS OF THE INVENTION

It is known that electrical junction boxes, especially for burglar-alarm systems, should be centrally located (to facilitate wiring) while also being concealed from intruders, a desideratum that heretofore has not been satisfactorily achieved. It is the principal object of the present invention to solve this problem by providing a camouflaged busbar-carrying cover for a standard wall outlet box whereby distribution connections can be made to the cover while removed a short distance from the box (as wall-switch connection are now made). Other objects and advantages will become apparent as the following description proceeds.

BRIEF DESCRIPTIONS OF THE DRAWING FIGURES

DETAILED DESCRIPTION

Figure 1:
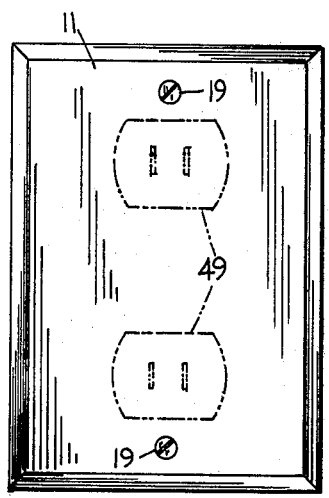
FIG. 1 is a front elevational view of the cover plate.
Figure 2:
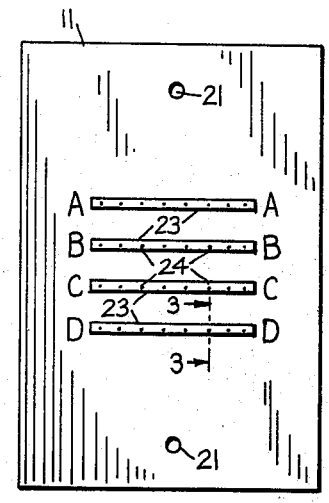
FIG. 2 is a rear elevational view of the plate of FIG. 1.
Figure 3:
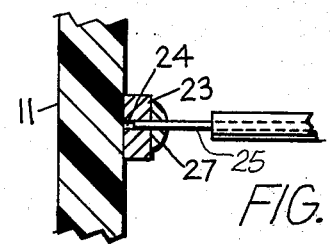
FIG. 3 is an enlarged fragmentary elevational view in section taken on the line 3—3 of FIG. 2.

With reference first to FIGS. 1-3 of the drawings, the numeral 11 designates a rectangular plate of a size sufficiently large to cover the open face of a standard electrical outlet-box (herein to be used as a junction-box). The outlet-box (part 13 in FIG. 5) has integral marginal tabs 15 bent to lie in the plane of the open face of the box 13. The tabs 15 have tapped bores 17 to receive screws 19, which pass through holes 21 in the cover plate 11 to fasten it to the box 13.

The cover plate 11 is preferably made of a plastic insulating material so that copper or brass busbars 23 can be cemented to the back surface of the plate without requiring the use of interposed insulating material that would be needed if the plate 11 were metallic. The spaced and insulated busbars 23 may be plain or may have small spaced holes 24 formed therein to receive the bared tinned end of an insulated wire 25 (FIG. 3) to facilitate its being soldered (by a solder bead 27) to the busbar 23.

Figure 4:
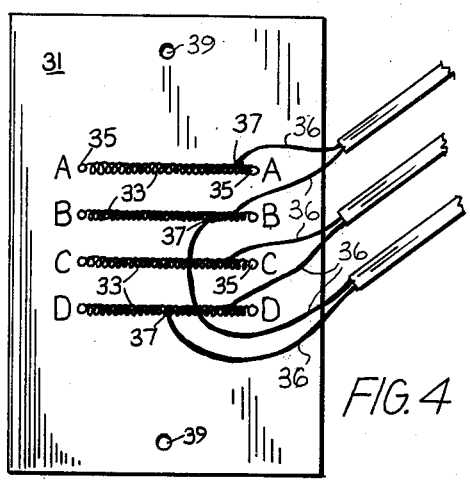
FIG. 4 is a rear elevational view of a second (coil-spring) species of the cover plate.

FIG. 4 discloses a modified form of cover plate 31 of basically the same construction as plate 11. In this species, brass coil-springs 33 have their ends cemented at 35 to the rear surface of the plate 31. The convolutions of the springs 33 are so closely spaced that they grip the bared ends of insulated wires 36 to facilitate soldering them at 37 to the coil-springs 33. Screw-receiving holes 39 serve the same purpose as do holes 21 in the plate 11.

Figure 5:
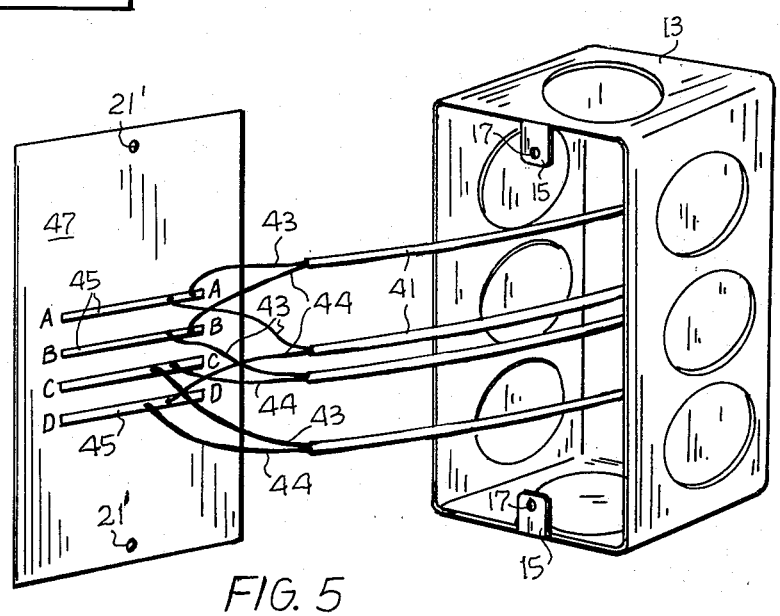
FIG. 5 is an exploded perspective elevational view showing positions of the box and the plate during soldering wiring.

FIG. 5 shows how jacketed pairs 41 of separately insulated wires 43 and 44 are brought into the junction box 13 from interwall space, and are connected to the several busbars 45 while the cover 47 is held at a convenient working distance from the box 13.

An important feature of the invention is the camouflage-type concealment of the junction box produced by making the front face of the cover plate simulate a plate exposing and partly covering an electrical device normally mounted in a wall outlet box. The simulation can be effected by imprinting or by adding a decalcomania 49 (FIG. 1).

The invention having been described, what is claimed is:

1. A camouflaged busbar-carrying cover for a standard in-wall-mounted junction box, comprising: a plate formed at least partly of insulating material and of a size to cover said junction box, a plurality of busbar-like elements fixed to the rear surface of said plate so as to be insulated from each other, and means carried by the face of said plate to simulate the exposed portions of a conventional electrical device normally substantially incased behind a plate of this type.

2. A cover according to claim 1 wherein said busbar-like elements have spaced wire-diameter apertures therein to facilitate placement of ends of electric wires therein for their soldering to said elements.

3. A cover according to claim 1 wherein said busbar-like elements are coil-springs constructed for gripping the ends of electric wires to facilitate their soldering to said elements.

4. A cover according to claim 1 wherein the front surface of said plate is constructed to simulate exposed portions of an electrical device for camouflage purposes.

* * * * *